Oct. 20, 1942.  I. E. ELM  2,299,083

ELECTRICALLY COMPENSATED GEOGRAPHIC POSITION INDICATOR

Filed Nov. 26, 1940  2 Sheets—Sheet 1

INVENTOR
IENAR E. ELM.
BY
ATTORNEYS.

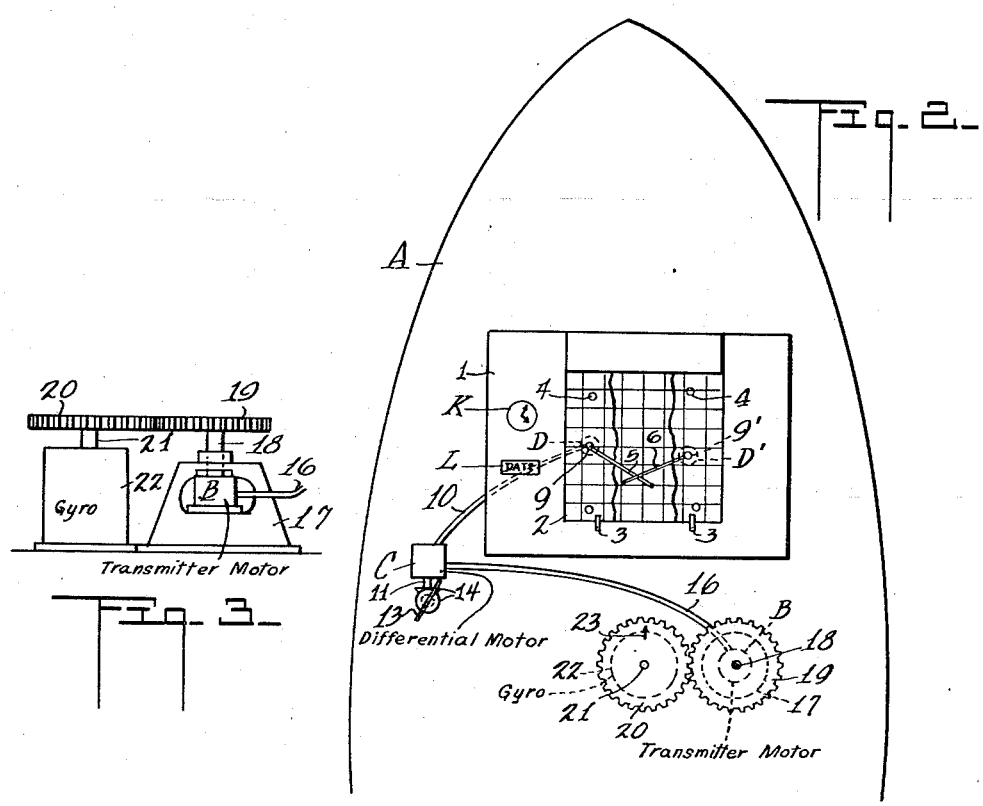
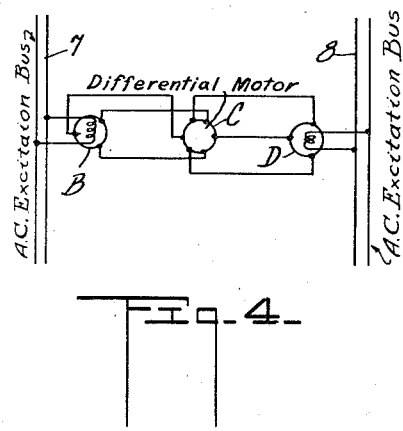

Patented Oct. 20, 1942

2,299,083

UNITED STATES PATENT OFFICE 2,299,083

ELECTRICALLY COMPENSATED GEOGRAPHIC POSITION INDICATOR

Ienar E. Elm, Piedmont, Calif.

Application November 26, 1940, Serial No. 367,245

4 Claims. (Cl. 250—11)

The present invention relates to improvements in an electrically compensated geographic position indicator, and it consists of the combinations, constructions and arrangements hereinafter described and claimed.

In my copending application on an automatic continuous visual geographic position indicator, Serial No. 273,938, filed May 16, 1939, I disclose a map which may be manually oriented, and I further disclose direction-indicating members swingable over the map about points representing tuned-in radiant energy stations. The direction-indicating members are automatically and continuously kept pointing away from the sources of radiant energy, and the intersection of the members will give the exact location of the craft on the map.

The manual orientation of the map was changed to automatic orientation by means of a gyro or gyro repeater in my second copending application, Serial No. 322,438, filed March 6, 1940, on a continuously oriented map with position indicating means. The gyro or gyro repeater is directly connected to the map-carrying frame so as to keep the map automatically oriented at all times.

The third copending application on a permanent geographic route recorder, Serial No. 328,050, filed April 5, 1940, was directed to means for taking periodic pictures of a continuously oriented map on which direction-indicating members continuously indicated the correct position of the craft on the map.

In my fourth copending case, Serial No. 365,204, filed November 12, 1940, on a reciprocal position indicator and televisor for vessels, I disclosed means for continuously transmitting a picture of the map and direction-indicating means of one vessel or craft to a second craft so that a navigator in the second craft could compare the picture with a map and direction-indicating means giving the position of the second craft on the map. The map is continuously kept oriented by a gyro or gyro repeater.

It requires a special chart table construction to continuously keep a map oriented, and it is both costly and requires considerable space. The principal object of my present invention is to provide novel means for compensating the swinging of the direction-indicating members over the map in direct ratio to the swinging of the craft or vessel with respect to true north or any other point of reference around the vertical axis of the vessel. This will permit the map to be held on a fixed chart table in the craft and the direction-indicating members will be automatically compensated in their swinging movement as the craft itself rotates around its vertical axis and the members, therefore, will always give the true position of the craft on the map, even though the map is only oriented with respect to a reference line on the craft.

Other objects and advantages will appear as the specification proceeds, and the novel features will be particularly set forth in the appended claims.

My invention is illustrated in the accompanying drawings, forming part of this application, in which:

Figure 2 is a schematic view of the craft, map and the associated mechanism;

Figure 3 is a side elevation of the gyro or gyro repeater and shows its mechanical connection with one of the self-synchronous motors; and Figure 4 is a wiring diagram illustrating how the three self-synchronous motors are electrically connected together.

Figure 1:
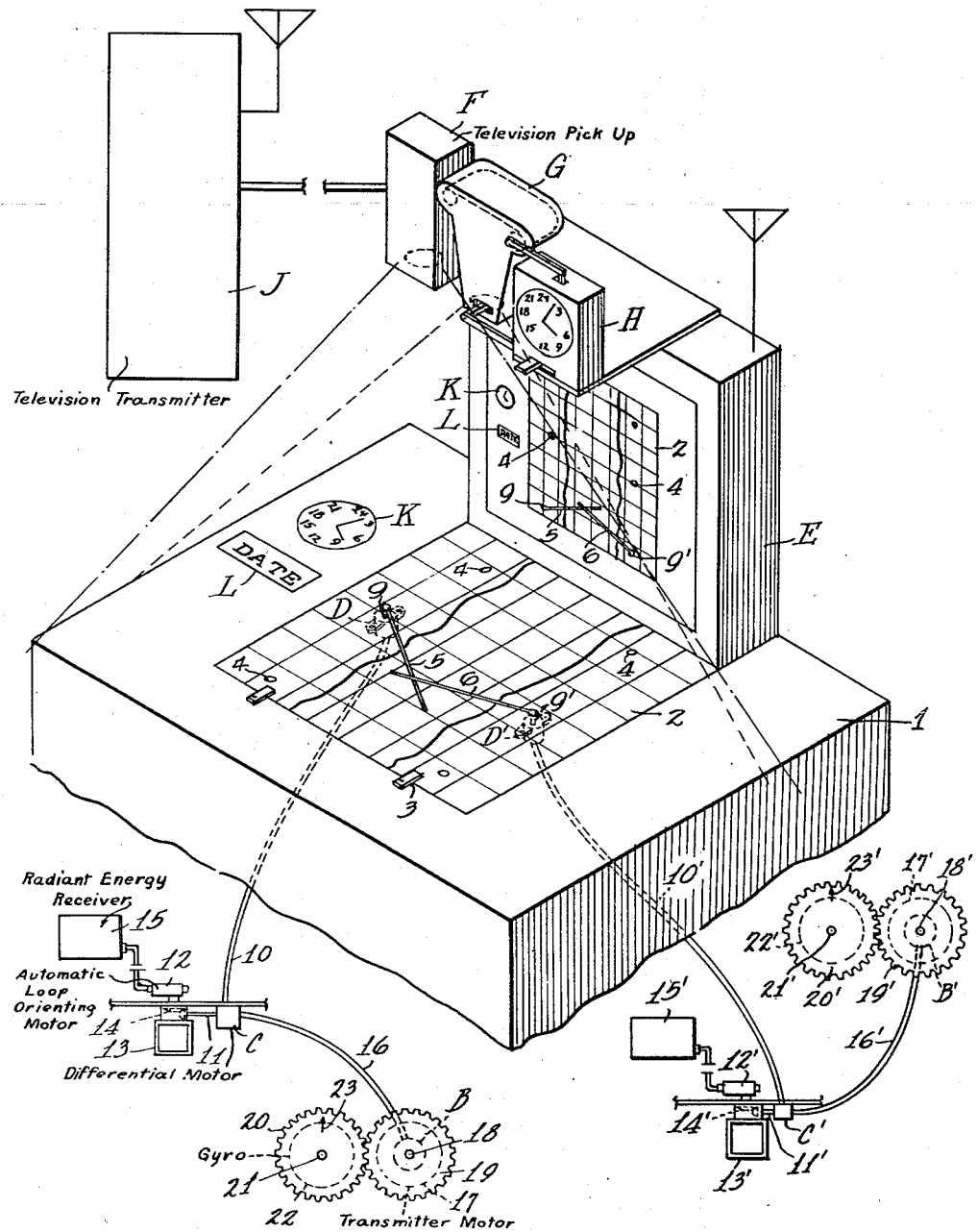
Figure 1 is a schematic view of the entire invention.

While I have shown only the preferred form of my invention, it should be understood that various changes or modifications may be made within the scope of the appended claims without departing from the spirit of the invention.

In carrying out my invention, I make use of a craft A, which may be a boat as shown in Figure 2. The word "craft" as used herein is a generic term and includes any type of vehicle or vessel that is movable over the ground, in the air, and on or under the water. It should be clearly understood that I do not wish to be limited in this connection.

The craft A has a chart table I fixedly secured therein as indicated in Figure 2. A map or chart 2 is removably secured in the chart table so that it or any other chart placed thereon has a fixed position relative to some reference line, and is held in place by any suitable fastening means, such as by clips 3, as set forth in my first copending application, Serial No. 273,938. The map 2 has openings 4, each representing the exact location of a radiant energy transmitting station that is located in the territory included in the map. The map 2 and the chart table I are not automatically and continuously oriented as in my three copending applications, Serial Nos. 322,438; 328,050; and 365,204.

I provide other means for automatically compensating the swinging of direction-indicating members 5 and 6 for the angular movements of the craft with respect to true north—in other words to compensate for any rotation around its vertical axis.

The compensating means includes a set of three self-synchronous motors for actuating each direction-indicating member. I use a Selsyn self-synchronous instrument, although I do not wish to be confined to any particular kind of self-synchronous motor. In Figure 4, I illustrate a Selsyn differential system, which makes use of a set of three self-synchronous instruments. The Selsyn transmitter motor B is electrically connected to the differential motor C, which in turn is electrically connected to the receiver motor D. An A. C. excitation bus indicated generally at 7 is in electrical connection with the transmitter instrument B, while a second A. C. excitation bus 8 is electrically connected to the receiver instrument D. If any two of the motors have their shafts rotated simultaneously, the third will rotate its shaft through an angle equal to the algebraic sum of their movements, the algebraic sign being dependent not only upon the physical direction of rotation of the rotors, but also upon the phase rotation of the windings.

Referring now to Figure 1, the receiver motor D is secured in a fixed orientation on the underside of the map 2 and has its shaft 9 inserted through one of the openings 4 and connected to the direction-indicating member 5 without 180° ambiguity. The wiring between the motors D and C as disclosed in Figure 4 is carried by the cable 10. The motor C has its shaft 11 operatively connected to an automatic loop orienting motor 12 and to a loop 13 by bevel gears 14, or other suitable means. A radiant energy receiver indicated generally at 15 is electrically connected to the loop orienting motor so that a tuning-in of a radiant energy sending station will cause the loop 13 to continuously maintain a fixed position with respect to the sending station, regardless of the position of the craft in which the device is mounted. The particular means for continuously orienting the loops illustrated in Figure 1 is that described in the catalogue entitled "The Sperry-RCA Automatic D/F" and published September 1938 by Sperry Gyroscope Co., Inc.

The motor C is electrically connected to the motor B by the wires illustrated in Figure 4, and these wires are received in a cable 16, see Figure 1. In Figure 3, the motor B is mounted in a support 17 and the motor shaft 18 is rotated by a gear 19, mounted on the shaft and meshing with a similar gear 20 so that the Selsyn motor's rotation will be equal to and in the same direction as the rotation of the vessel around its vertical axis. The gear 20 is keyed to the shaft 21 of a gyro or gyro repeater 22, or otherwise operatively connected thereto.

The gyro or gyro repeater will function for continuously maintaining the gear 20 where the arrow 23 thereon will always point to true north, regardless of the angular position of the craft with respect to true north. Any angular swinging of the craft with respect to true north will, therefore, cause a relative rotation of the gear 20 with respect to the craft and this rotation will be imparted to the gear 19 and shaft 18 of the transmitter motor B.

At the same time, the loop 13 will continuously keep at a predetermined angle to the tuned-in radiant energy station and, therefore, will swing relative to the craft as the latter moves along. The rotation of the loop is imparted to a like rotation of the shaft 11 of the motor C. The algebraic sums of the two rotative movements of the shafts 11 and 18 will be imparted to the shaft 9 of the receiver motor D with the result that the swinging of the direction-indicating arm 5 will be compensated for any angular swinging of the craft away from a position heading in a true northerly direction. In other words, the differential system of the three self-synchronous instruments does away with the necessity of continuously orienting the map 2 or chart table 1.

The exact same mechanism is used for swinging the direction-indicating arm 6 over the map surface as already described for the arm 5. Similar parts, other than the arm 6, will be given like reference numerals, except that they will be primed and further description of this part of the invention need not be given. The duplicate mechanism for the arm 6 is only diagrammatically illustrated in Figure 1 and not in Figure 2, in order that the showing in Figure 2 will not be too complicated and confusing.

Before describing the operation of the invention, it is best to state that the chart table 1 may support a television receiver E, a television pick-up F, a camera G, and a twenty-four hour clock H for periodically actuating the camera shutter for taking pictures of the map, direction-indicating arms, clock K and date L, and for advancing the film after each picture. The television pick-up is in electrical connection with a television transmitter J. These features have been described and claimed in my last two applications, Serial Nos. 328,050 and 365,204.

From the foregoing description of the various parts of the device, the operation thereof may be readily understood. The chart table 1 will have openings in its front and sides for permitting access to the underside of the map 2 for placing the receiver motors D and D' at the desired openings 4. It is obvious that the map 2 may be swung upwardly with respect to the top of the chart table to effect the changing of the motors to other openings 4, if desired. Any suitable means for securing the motors D and D' to the map 2 may be used so that the motors will be attached in a predetermined fixed orientation. The radiant energy receivers 15 and 15' are tuned to the same radiant energy sending stations represented by the openings 4 that receive the motor shafts 9 and 9'. The motor shafts 11 and 11' are turned in direct ratio to the turning of the radiant energy receiving members and the motor shafts 18 and 18' will be turned in direct ratio to the turning of the gears 20 and 20' as the latter turn with respect to the craft when the craft swings into angular positions around its vertical axis. The turning of the motor shafts 11 and 11' and the motor shafts 18 and 18' will cause the motor shafts 9 and 9' to turn through the algebraic sum of the first two shafts. The shafts 9 and 9' will cause the direction-indicating arms to give continuous indication and they will instantly turn when either or both of the motors associated therewith are turned.

The map 2 need not be continuously oriented and this is the principal advantage of the present invention. The direction-indicating arms 5 and 6 will give the correct position of the craft on the map regardless of the angular position assumed by the craft with respect to true north.

I claim:

1. The combination with a map mounted in a craft so as to turn therewith and having openings representing sources of radiant energy on the territory included in the map, of two elongated direction-indicating members, a receiver self-synchronous motor for each member and having a shaft insertable through the desired opening in the map, said members being securable to the shafts, a self-synchronous differential motor with shaft for each of said receiver motors and being electrically connected therewith, radiant energy direction finders operatively connected to the differential motor shafts, means for automatically orienting the radiant energy direction finders for turning the shafts of the differential motors, a self-synchronous transmitter motor with shaft for each differential motor and being electrically connected therewith, and a gyro operated mechanism for each transmitter motor and being operatively connected to the transmitter motor shaft, said radiant energy direction finders turning the differential motor shafts in direct ratio to the angular movement of the craft with respect to the tuned-in radiant energy sources, whereby the direction-indicating members will be swung through the algebraic sum of the angular movements of the transmitter and differential motor shafts.

2. In a device of the type described, a map mounted in a craft and oriented with respect to the craft and illustrating the territory over which the craft is moving, said map having points thereon representing sources of radiant energy on the territory included in the map, at least two receiver self-synchronous motors, shafts carried by the motors and positioned at two of the map points, direction-indicating members swingable by the shafts and intersecting each other, a differential self-synchronous motor electrically connected to each receiver motor, said differential motors having shafts, two radiant energy receiving members, automatic means for causing the last-named members to always extend at a certain angle with respect to the received radiant energy waves, said differential motors having their shafts operatively connected to the radiant energy receiving members so as to be turned thereby, transmitter self-synchronous motors electrically connected to the differential motors, said transmitter motors having shafts, gyro controlled means for maintaining the transmitter motor shafts at the same angle of rotation as the rotation of the craft around its vertical axis, whereby the receiver motor shafts will compensate for the angular movement of the craft and will cause the direction-indicating members to always correctly indicate the position of the craft on the map.

3. In a device of the type described, a map oriented with respect to a craft in which it is mounted and having points thereon representing sources of radiant energy on the territory illustrated by the map, receiver self-synchronous motors placed at desired points on the map and having shafts, direction-indicating members removably secured to the shafts, differential self-synchronous motors electrically connected to the first-named motors and having shafts, automatic means for continuously maintaining the differential motor shafts in a predetermined angular position with respect to the incoming direction of the received radiant energy coming from the stations corresponding to the map points about which the direction-indicating members pivot, transmitter self-synchronous motors electrically connected to the differential motors and having shafts, automatic gyro-controlled means for continuously maintaining the transmitter motor shafts in a predetermined angular position with respect to the rotation of the craft around its vertical axis, whereby the receiver motor shafts will be moved through the algebraic sum of the combined movements of the differential and transmitter motor shafts, and will cause the direction-indicating members to give the correct location of the craft on the map, regardless of the angular position the map and craft make with true north.

4. The combination of a map oriented only with respect to a craft in which it is mounted, direction-indicating members pivotally mounted on points on the map corresponding to sources of radiant energy on the territory depicted by the map, self-synchronous motors, shafts carried by the motors and connected to the members for swinging the latter, means for tuning in the sources of radiant energy corresponding to the pivotal positions of the members and including two radiant energy receiving members that will always maintain a predetermined position with respect to the two tuned-in stations, a second pair of self-synchronous motors having shafts, each being operated by a radiant energy receiving member and being electrically connected to one of the first mentioned motors that corresponds to the tuned-in station, a third pair of self-synchronous motors having shafts, means for continuously maintaining the third pair of motor shafts in a predetermined angular position with respect to the rotation of the craft around its vertical axis and being in electrical connection with the second pair of motors, whereby each direction-indicating member will have its motor shaft swing through the algebraic sum of the two motor shafts associated therewith.

IENAR E. ELM.